(12) United States Patent
Kraft et al.

(10) Patent No.: US 7,410,219 B2
(45) Date of Patent: Aug. 12, 2008

(54) MOUNTING DEVICE FOR THE HEADREST OF A VEHICLE SEAT

(75) Inventors: Dieter Kraft, Langenaltheim (DE); Lars Merkert, Freising (DE); Richard Hielckert, Weichering (DE)

(73) Assignee: Faurecia Autositze GmbH & Co. KG, Stadthagen (DE)

(*) Notice: Subject to any disclaimer, the term of this patent is extended or adjusted under 35 U.S.C. 154(b) by 8 days.

(21) Appl. No.: 11/413,114

(22) Filed: Apr. 28, 2006

(65) Prior Publication Data

US 2006/0261661 A1 Nov. 23, 2006

(30) Foreign Application Priority Data

Apr. 29, 2005 (DE) ............... 10 2005 019 946

(51) Int. Cl.
*A47C 7/36* (2006.01)
(52) U.S. Cl. ............... 297/410; 297/391; 297/404
(58) Field of Classification Search ........... 297/410, 297/391, 404
See application file for complete search history.

(56) References Cited

U.S. PATENT DOCUMENTS

| | | | |
|---|---|---|---|
| 4,854,642 A | | 8/1989 | Vidwans et al. |
| 5,788,250 A | * | 8/1998 | Masters et al. ............ 297/410 |
| 5,816,658 A | * | 10/1998 | Wallis ...................... 297/410 |
| 5,997,090 A | | 12/1999 | Baloche et al. |
| 6,056,364 A | | 5/2000 | De Filippo |
| 6,062,645 A | * | 5/2000 | Russell ..................... 297/410 |
| 6,068,337 A | | 5/2000 | De Filippo |
| 6,260,924 B1 | | 7/2001 | Jones et al. |
| 6,733,079 B2 | * | 5/2004 | Gans et al. ............... 297/410 |
| 6,880,891 B2 | * | 4/2005 | Yetukuri et al. .......... 297/410 |

(Continued)

FOREIGN PATENT DOCUMENTS

DE G 90 11 486.8 11/1990

(Continued)

OTHER PUBLICATIONS

German Office Action dated Dec. 29, 2005 in German Application No. 10 2005 019 946.1-16, filed Apr. 29, 2005 (3 pages).

(Continued)

*Primary Examiner*—Rodney B. White
(74) *Attorney, Agent, or Firm*—Shlesinger, Arkwright & Garvey LLP

(57) ABSTRACT

Mounting device for a headrest with two headrest rods for a vehicle seat, which includes a first guide sleeve for the height-adjustable accommodation of a first headrest rod, a second guide sleeve for the height-adjustable accommodation of a second headrest rod, and a first receptacle device secured in the backrest, in which the first guide sleeve is held and rests at at least two axially spaced bearing points. A second receptacle device is secured in the backrest, within which the second guide sleeve can be shifted at least in the transverse direction. The second guide sleeve rests in the second receptacle device, which is secured in the backrest. Advantageously, the second guide sleeve is pivotably held in the second receptacle device, which is secured in the backrest, and the second headrest rod is pivotably held in the second guide sleeve.

13 Claims, 16 Drawing Sheets

U.S. PATENT DOCUMENTS

| | | | |
|---|---|---|---|
| 6,948,773 B2 * | 9/2005 | Yetukuri et al. | 297/410 |
| 7,108,327 B2 * | 9/2006 | Locke et al. | 297/410 |
| 7,309,108 B2 * | 12/2007 | Tsutsui et al. | 297/410 |
| 2003/0222492 A1 * | 12/2003 | Nemoto et al. | 297/410 |
| 2006/0108851 A1 * | 5/2006 | Tsutsui et al. | 297/410 |

FOREIGN PATENT DOCUMENTS

| | | |
|---|---|---|
| DE | 42 01 829 A1 | 6/1993 |
| DE | 44 00 911 A1 | 8/1994 |
| DE | 44 44 122 C1 | 4/1996 |
| DE | 196 35 740 A1 | 3/1997 |
| DE | 196 00 789 C2 | 7/1997 |
| DE | 297 07 562 U1 | 10/1997 |
| DE | 42 16 584 C2 | 7/1998 |
| DE | 197 13 753 C2 | 10/1998 |
| DE | 197 24 554 A1 | 12/1998 |
| DE | 198 82 413 T1 | 5/2000 |
| DE | 698 00 455 T2 | 6/2001 |
| DE | 103 01 2283 B3 | 7/2001 |
| DE | 100 26 530 A1 | 12/2001 |
| DE | 101 42 981 A1 | 3/2003 |
| DE | 101 60 929 A1 | 7/2003 |
| DE | 102 30 637 A1 | 1/2004 |
| DE | 103 01 283 B3 | 1/2004 |
| DE | 102 40 042 A1 | 11/2004 |
| DE | 103 15 375 A1 | 11/2004 |
| DE | 10 2004 038 707 A1 | 4/2005 |
| EP | 0 901 934 A1 | 3/1999 |
| EP | 0 990 555 A2 | 4/2000 |
| EP | 1 046 541 A1 | 10/2000 |
| JP | 10147166 A | 6/1998 |
| JP | 2001097099 A | 4/2001 |
| WO | 99/38723 | 8/1999 |
| WO | 01/89875 A1 | 11/2001 |
| WO | 2004/062963 A1 | 7/2004 |

OTHER PUBLICATIONS

German Patent Office Action dated Mar. 22, 2005 in German Application No. 10 2004 049 191.7-74, filed Oct. 8, 2004 (2 pages).
German Office Action dated Oct. 24, 2005 in German Application No. 10 2005 003 819.0-16, filed Jan. 27, 2005 (2 pages).
German Office Action dated Mar. 10, 2005 in German Application No. 10 2004 045 988.6-42, filed, Sep. 22, 2004 (3 pages).
German Office Action dated Dec. 6, 2005 in German Application No. 10 2005 005 485.4, filed Feb. 4, 2005 (3 pages).
U.S. Appl. No. 10/358,326, filed Feb. 2003.
U.S. Appl. No. 11/213,738, filed Aug. 2005.
U.S. Appl. No. 11/230,925, filed Sep. 2005.
U.S. Appl. No. 11/238,963, filed Sep. 2005.
U.S. Appl. No. 11/284,898, filed Nov. 2005.
U.S. Appl. No. 11/299,747, filed Dec. 2005.
U.S. Appl. No. 11/328,192, filed Jan. 2006.
U.S. Appl. No. 11/346,313, filed Feb. 2006.
U.S. Appl. No. 11/377,335, filed Mar. 2006.
U.S. Appl. No. 11/387,979, filed Mar. 2006.
U.S. Appl. No. 11/444,504, filed Jun. 2006.
U.S. Appl. No. 11/481,800, filed Jul. 2006.
U.S. Appl. No. 11/500,487, filed Aug. 2006.
U.S. Appl. No. 11/520,708, filed Sep. 2006.
U.S. Appl. No. 11/528,516, filed Sep. 2006.
U.S. Appl. No. 11/543,897, filed Oct. 2006.
U.S. Appl. No. 11/592,966, filed Nov. 2006.
German Patent Office Action dated Mar. 10, 2005 in German Application No. 10 2004 045 988.6-42, filed Sep. 22, 2004 (3 pages).
German Patent Office Action dated Dec. 6, 2005 in German Application No. 10 2005 005 485.4, filed Feb. 4, 2005 (3 pages).

* cited by examiner

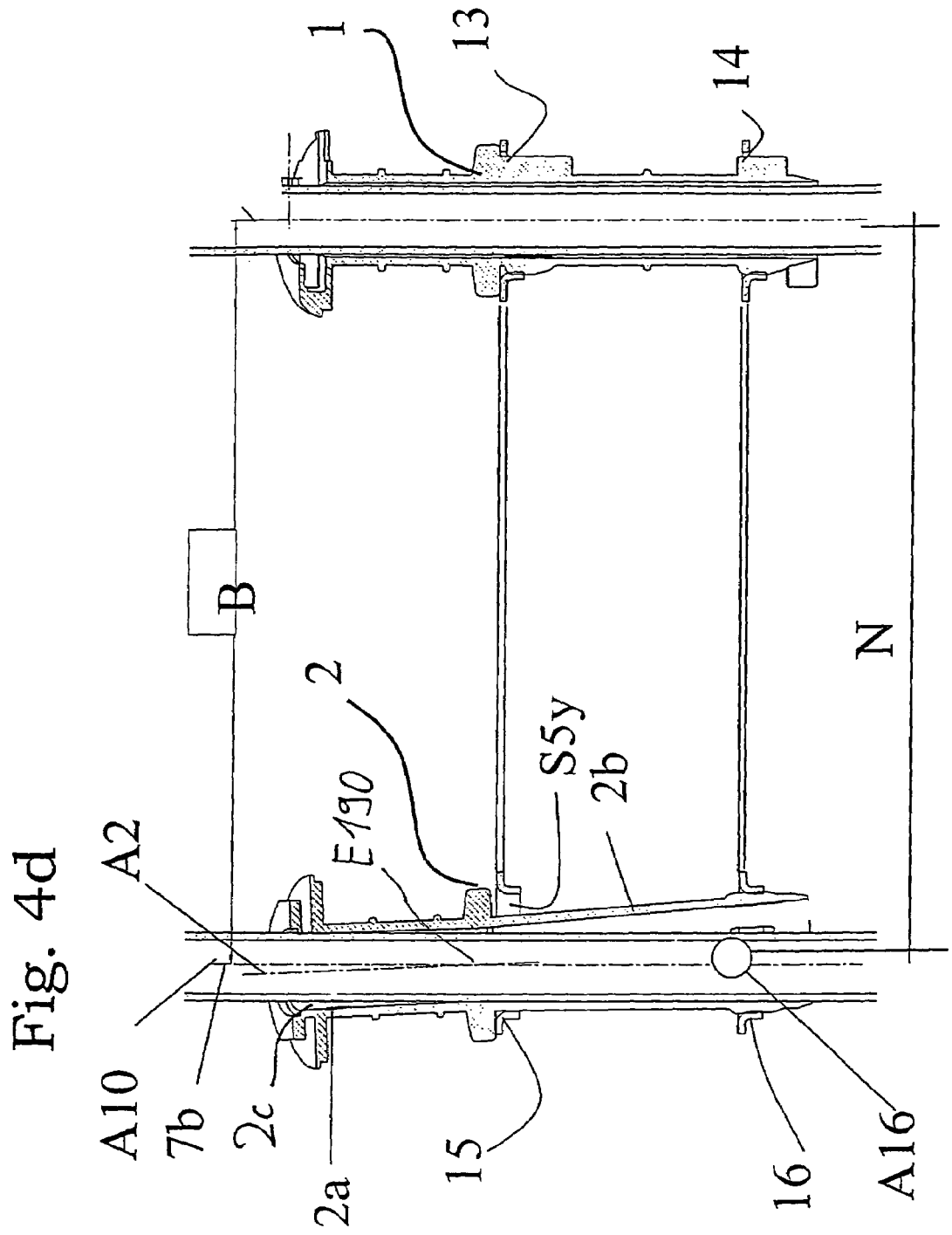

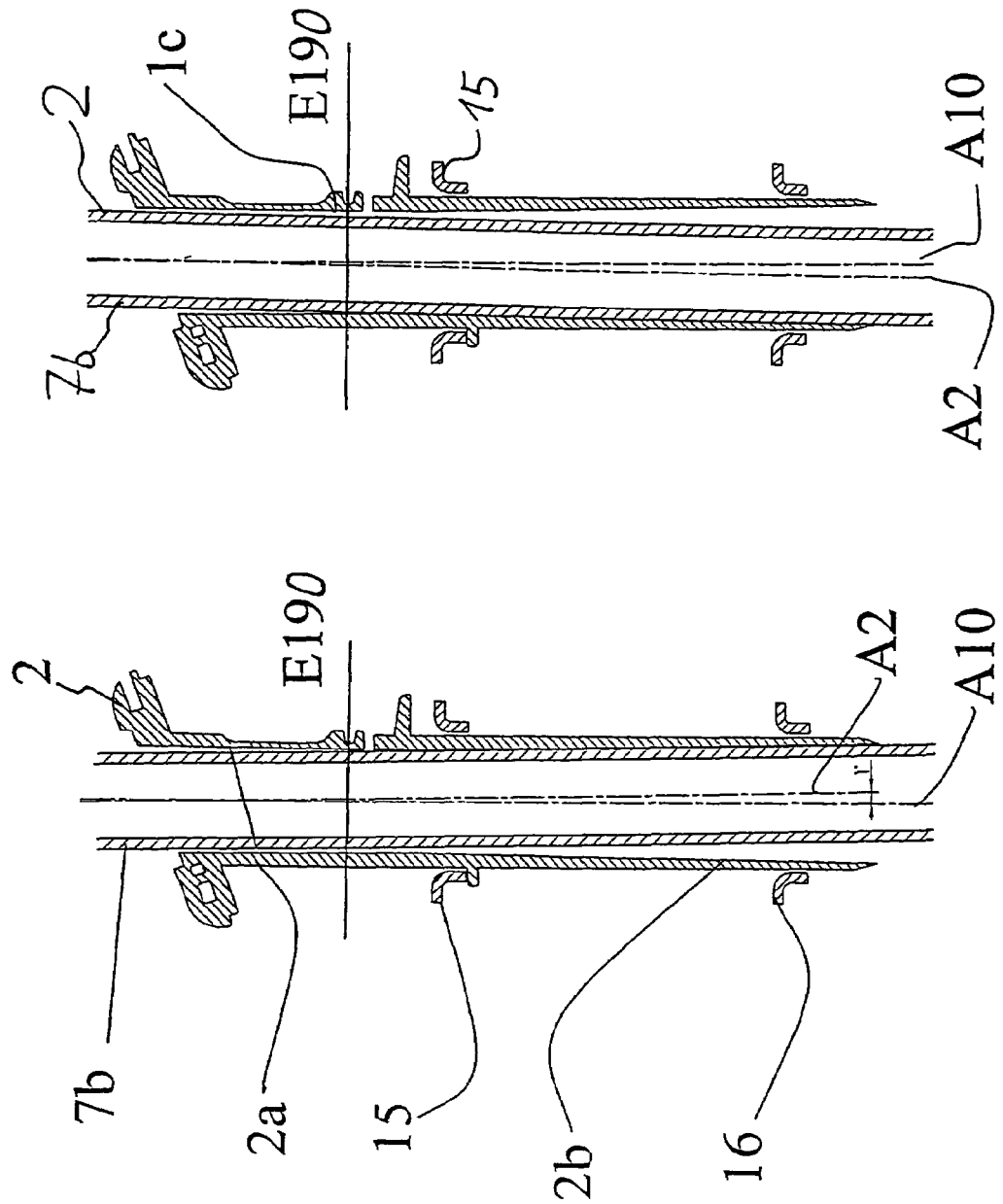

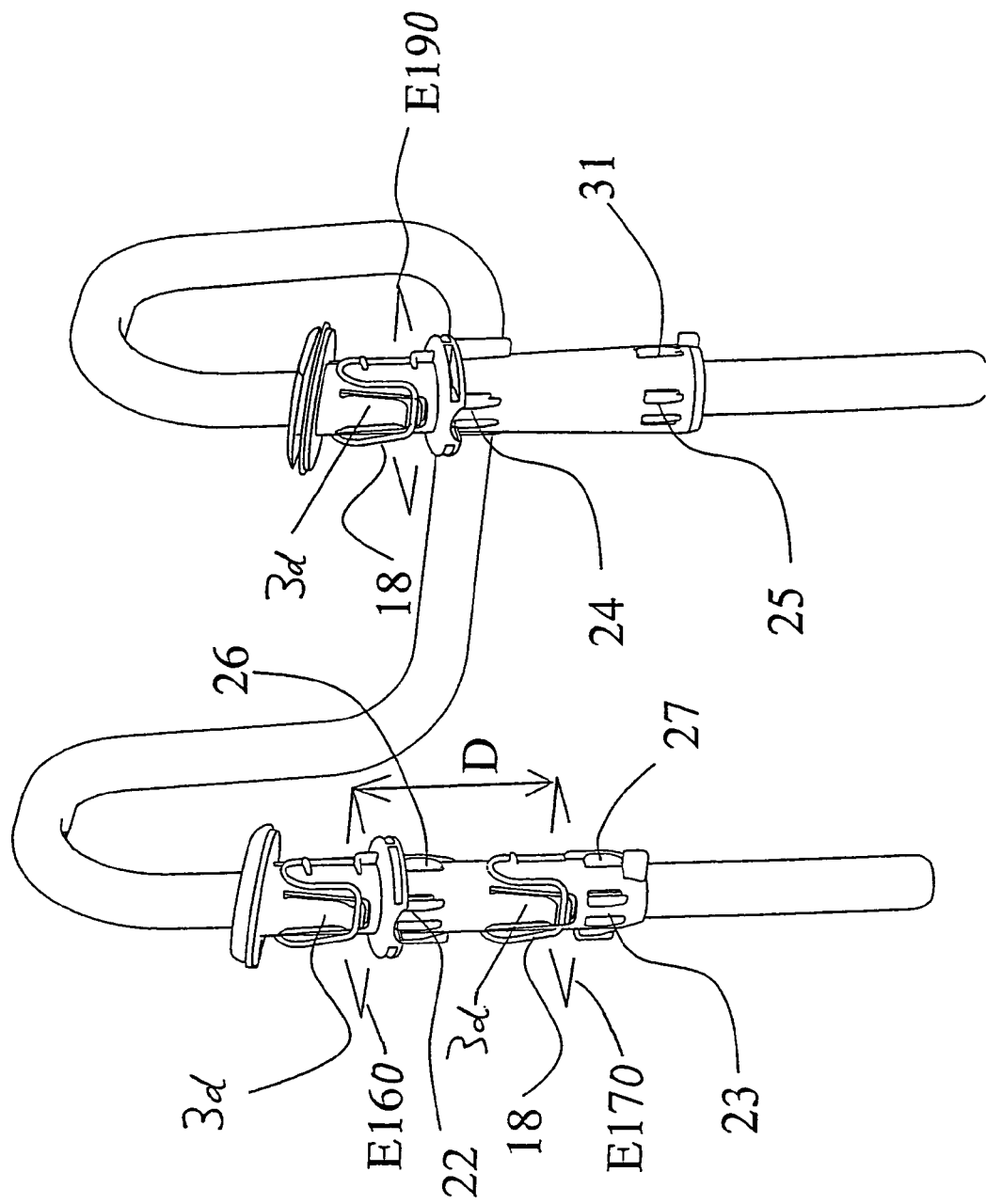

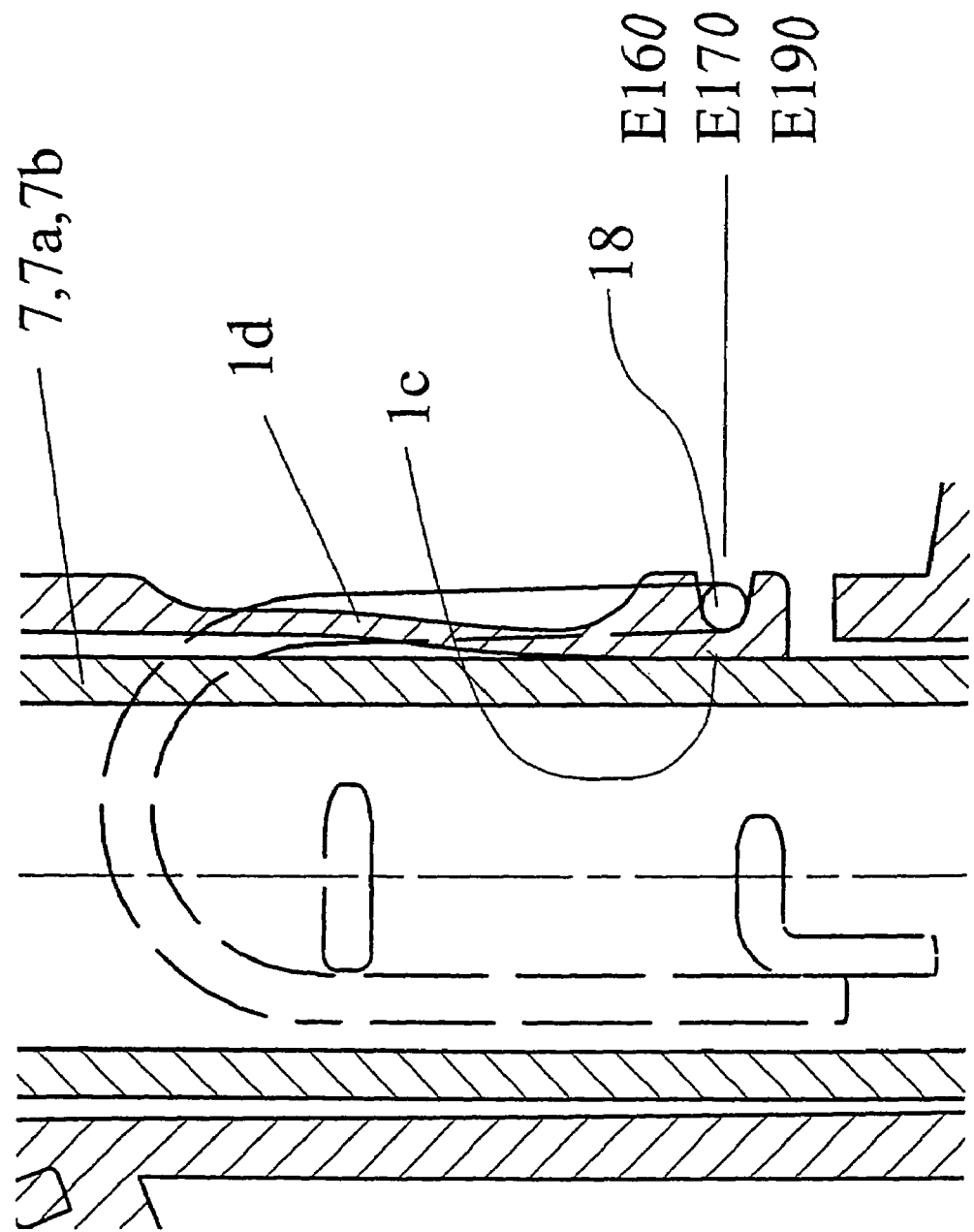

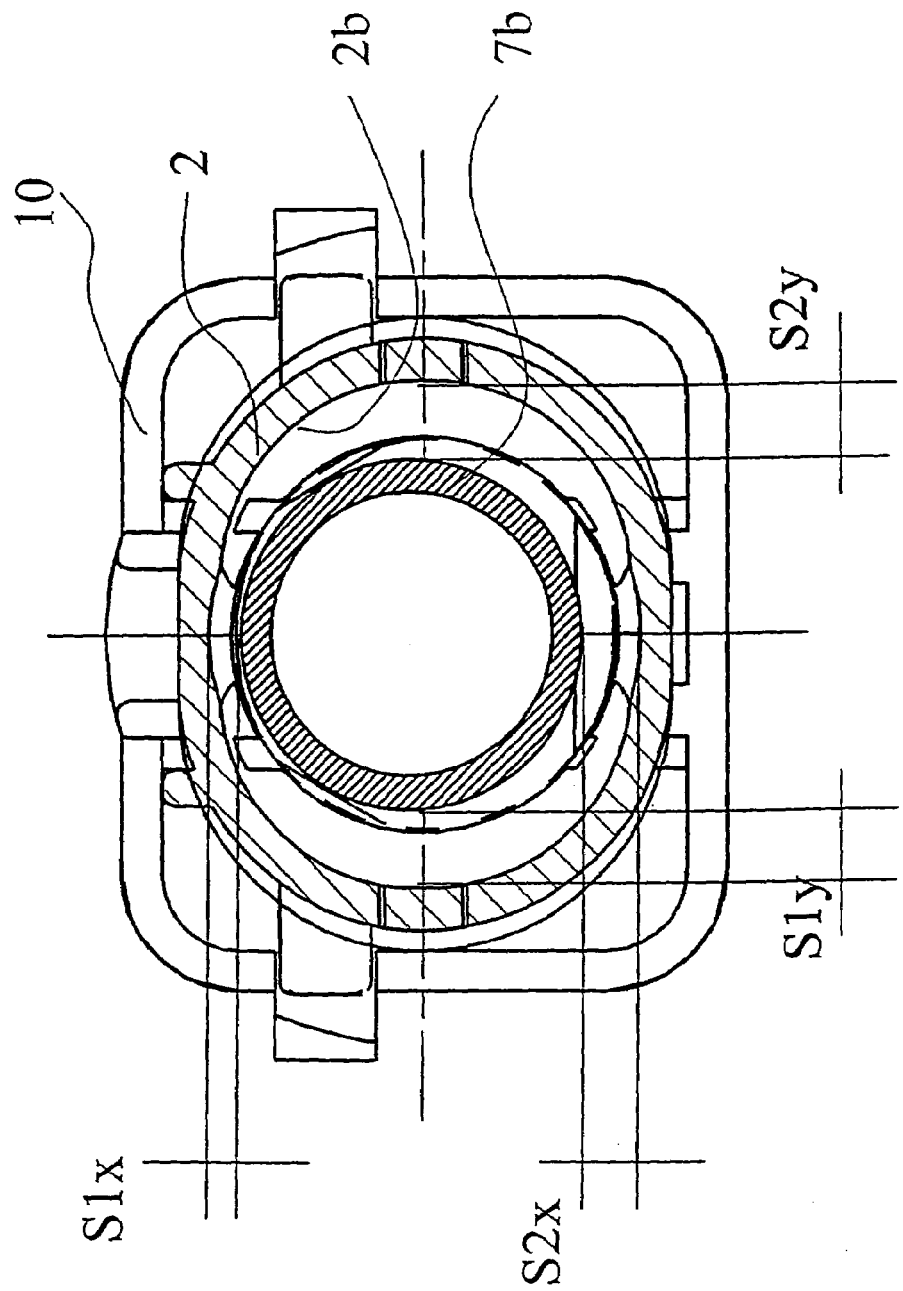
Fig. 7   Schnitt in E200

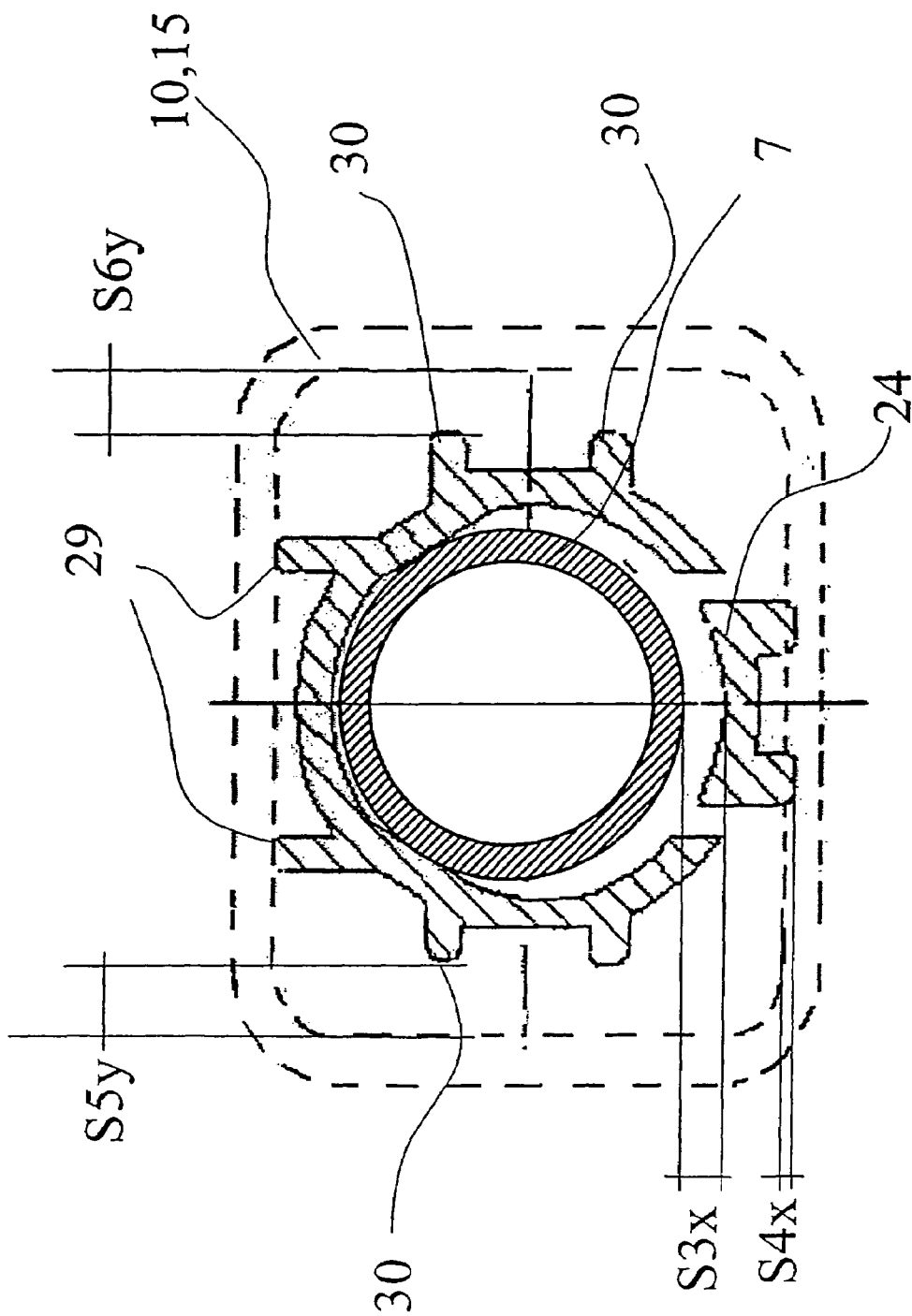

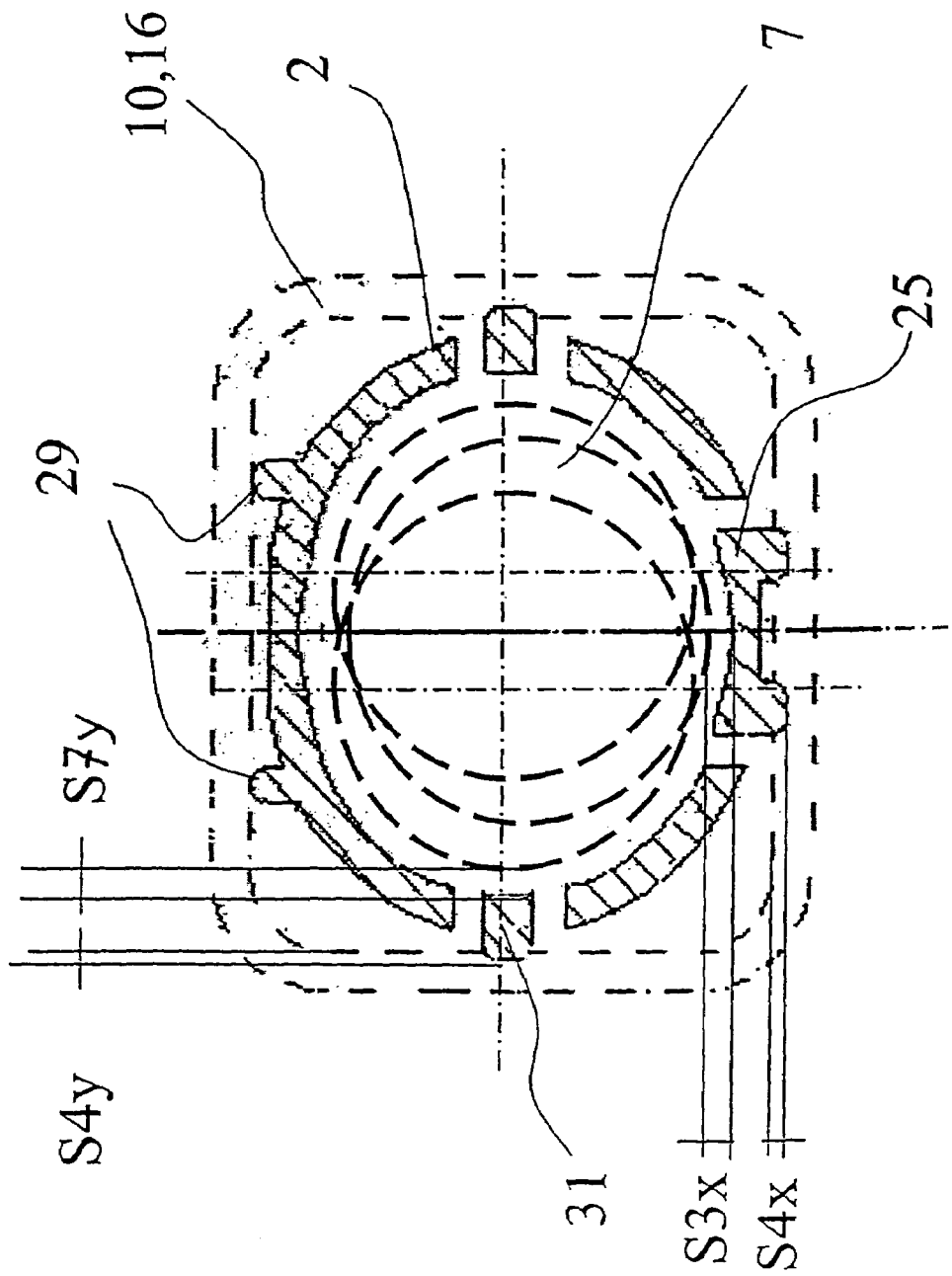
Fig. 7b Schnitt in E200

MOUNTING DEVICE FOR THE HEADREST OF A VEHICLE SEAT

CROSS-REFERENCE TO RELATED APPLICATION

This application claims priority of German application no. 10 2005 019 946.1, filed Apr. 29, 2005, which is incorporated herein by reference.

FIELD OF THE INVENTION

The invention relates to a mounting device for the headrest of a vehicle seat. More particularly, the invention relates to a mounting device for the headrest of a vehicle seat headrest with two headrest rods, a first and second guide sleeves for height-adjustably receiving first and second headrest rods, and the first and second guide sleeves being received in the receptacle devices when secured in a vehicle backrest.

BACKGROUND OF THE INVENTION

To allow the support and height-adjustable mounting of headrests, welded pieces of pipe or openings are customarily mounted in the upper regions of backrests, and are in turn used to affix guide sleeves for height-adjustably receiving the headrest rods of the headrest frame.

The guide sleeves must maintain the adjusted height position of the headrest, must also absorb torque and axial forces in the event of a crash; in addition, auxiliary components, such as controls that will allow removal of the headrest or adjustment of its position, must be accommodated to some extent. In this connection, the adjustment functions should glide easily, and the mounting forces should be low; furthermore, all of the adjustable positions for the headrest should be implemented without rattling during driving.

In practice, these requirements are frequently difficult or impossible to fulfill. To allow low adjustment forces, guide sleeves are frequently configured with a degree of play relative to the headrest rods, or high adjustment forces are established and grease is used to some extent on the guide rods.

For the components, strict requirements with regard to dimensional consistency and precision of positioning result, which in turn leads to high manufacturing and assembly costs. In particular, headrest frames having a very precise degree of parallelism and a precise track width result in high manufacturing costs.

One mounting device of the above-mentioned type is known from WO 2004/062963 A1. The headrest frame is height-adjustably received by its two headrest rods (or legs) in a first and a second guide sleeve. The first guide sleeve is secured and held within the receptacle device, which is secured in the backrest, and for which purpose, for example, a catch on the guide sleeve can latch into the receptacle device that is secured in the backrest. The second guide sleeve is held inside a support that widens into a funnel shape toward the top and toward the bottom from an upper pivot point, for the purpose of compensating for tolerances, with the support being pivotably held within a second receptacle device secured in the backrest.

Tolerances or dimensional variations in the headrest rods and the receptacle devices secured in the backrest are thus compensated for by the second receptacle device, to which end the support is able to pivot around a ball-joint-type connection on the second guide sleeve. A mounting device of this type makes it possible to compensate for even sizable dimensional variations, thus allowing the use of more cost-effective headrest frames, without requiring an excessive amount of force be applied to the headrest rods in order to adjust the height of the headrest. The friction between the guide sleeves and the headrest rods remains substantially constant. A latching mechanism is provided for the respective height adjustment is provided between the securely mounted guide sleeve and its headrest rod.

However, a mounting device of this type involves a complex construction with multiple components, and a correspondingly high assembly cost.

OBJECTS AND SUMMARY OF THE INVENTION

An object of the invention is to create a mounting device that, with a simple and cost-effective construction, will compensate for tolerances and dimensional variations, thus ensuring a low level of friction during the height adjustment of the headrest.

This object is attained with a mounting device for a headrest of a vehicle seat with two headrest rods, and the mounting device includes a first guide sleeve for height-adjustably receiving a first headrest rod, a second guide sleeve for height-adjustably receiving a second headrest rod, a first receptacle device secured in the backrest, and in which the first guide sleeve is held and rests at at least two axially spaced bearing points. A second receptacle device is secured in the backrest, within which the second guide sleeve can be shifted at least in the transverse direction. The second guide sleeve rests in the second receptacle device, which is secured in the backrest.

Advantageously, the second guide sleeve is pivotably held in the second receptacle device, which is secured in the backrest, and the second headrest rod is pivotably held in the second guide sleeve.

Additional embodiments and features of the invention are likewise set forth below.

According to the invention, both guide sleeves are thus held directly in the receptacle devices in the backrest; i.e., without an adjustable support placed between them. In this manner, a more cost-effective production and simpler assembly can be achieved with fewer components. Nevertheless, deviations in parallelism and dimensional variations in the headrest rods and the receptacle devices secured in the backrest can be compensated for via a suitable adjustment of the second —"movable"—guide sleeve.

The first guide sleeve is secured in the first receptacle device in the backrest at at least two pivot points that are spaced from one another in an axial direction; advantageously it is securely fastened; i.e., it is neither height-adjustable nor rotationally or linearly adjustable.

The receptacle devices in the backrest can be configured, for example, as tubular receptacles that are securely mounted in the backrest and have, for example, a rectangular cross-section, or as a pair of openings, or throughholes, arranged one above the other in the backrest.

According to one preferred embodiment, the second "movable" guide sleeve is mounted in the second receptacle device which is secured in the backrest, at a pivot point or in a pivoting plane, and assumes various pivot positions with differing track widths or dimensional tolerances for the headrest rods or the receptacle devices. Alternatively, however, a rotationally and linearly freely adjustable mounting of the second guide sleeve in its receptacle device is also possible.

Below, the invention will be described in detail using a number of embodiments, with reference to the attached set of drawings.

BRIEF DESCRIPTION OF THE DRAWINGS

FIG. 5 shows the adjustment of the second headrest rod and the second guide sleeve in the axial cross-section of the XZ plane; i.e., parallel to the direction of travel;

FIG. 6b shows the headrest frame with guide sleeves according to FIG. 1, in a perspective view from the rear;

FIG. 6c shows the positioning of the headrest rods in the guide sleeves in an axial cross-section of the XZ plane;

FIG. 7 shows a radial cross-section in the plane E200 from FIG. 1; i.e., of a plane of the second guide sleeve that does not serve as an adjustment position;

FIG. 7a shows a radial cross-section at the level of the opening 15;

FIG. 7b shows a radial cross-section in the plane E200 of the second guide sleeve, at various positions for the second headrest rod;

DETAILED DESCRIPTION OF THE INVENTION

Figure 1:
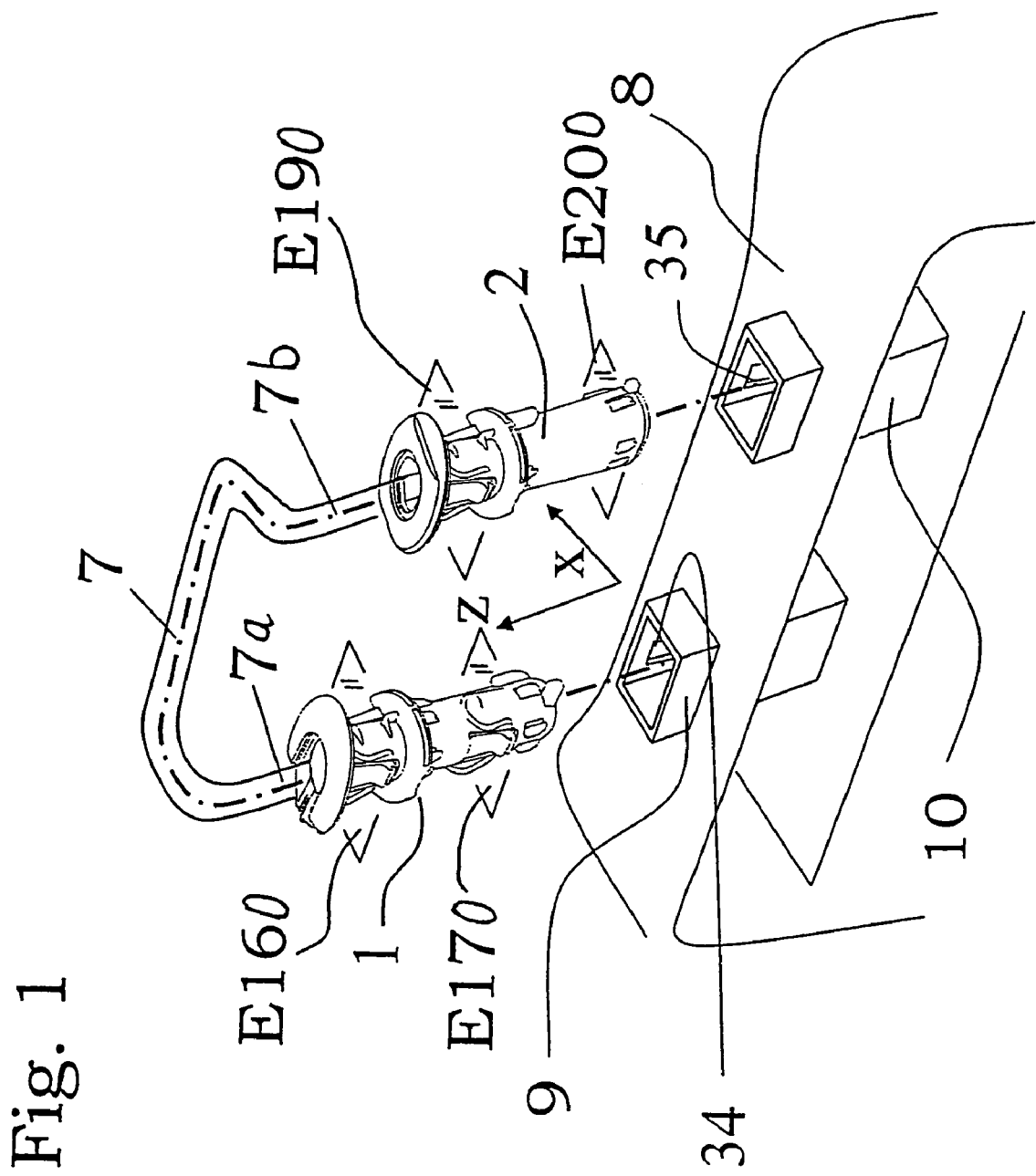
FIG. 1 is a partially exploded view of an upper backrest region with receptacles, guide sleeves, and a headrest frame, in a perspective view from the rear.

On a backrest 8, an unillustrated headrest is mounted such that its height can be adjusted, or such that it can be shifted in the vertical Z direction, by way of a headrest frame 7. For this, the headrest frame 7 is adjustably held with its left headrest rod 7a in a left guide sleeve 1 and with its right headrest rod 7b in a right guide sleeve 2, as will be described further below.

Figure 2:
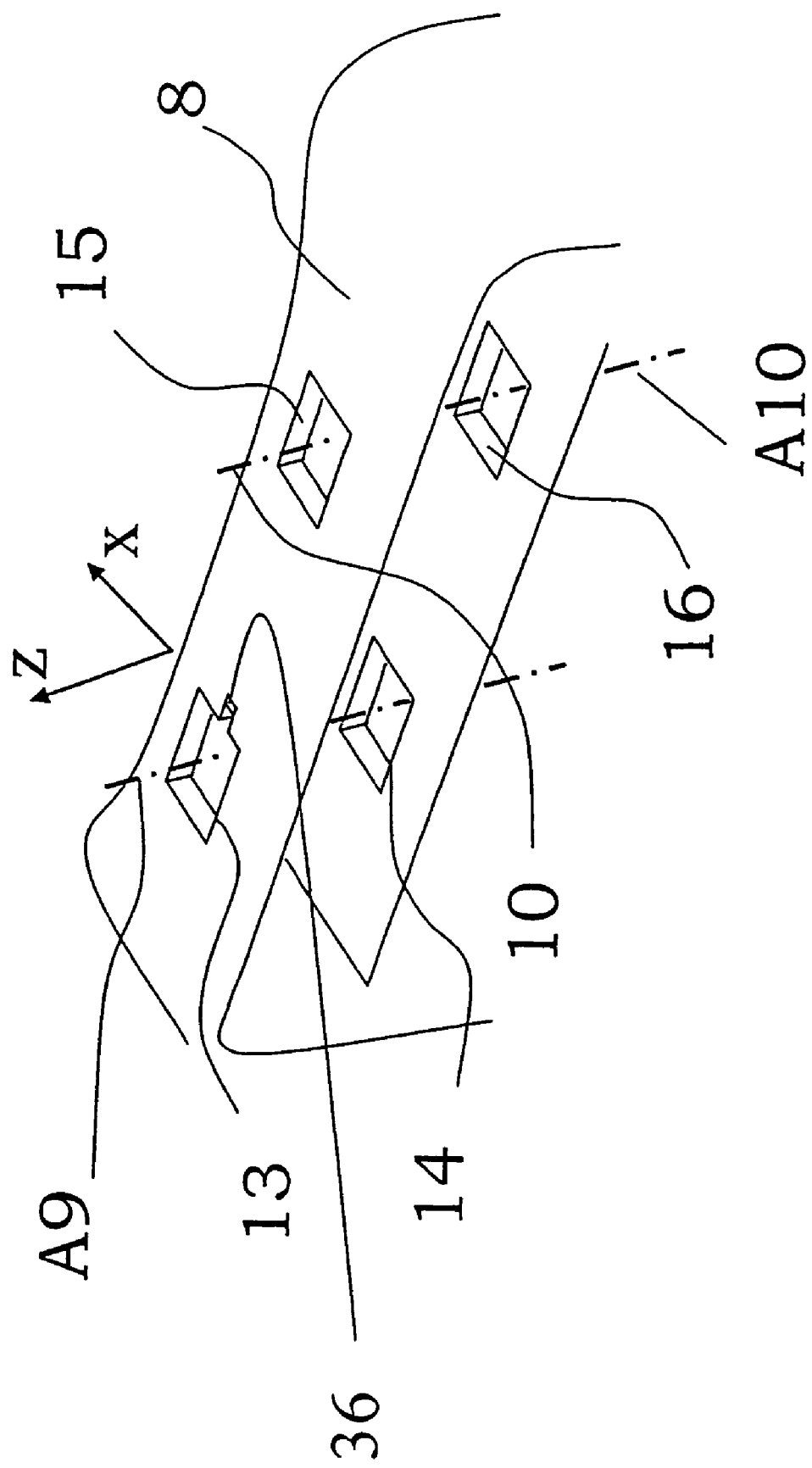
FIG. 2 is an alternative embodiment FIG. 1 with openings rather than receptacles, without depiction of the guide sleeves and the headrest frame.

The guide sleeves 1, 2 are in turn inserted from the top into respective receptacle devices 9, 10 or 13, 14, 15, 16 that are secured in the backrest 8. According to the embodiment shown in FIG. 1, a left receptacle 9 and a right receptacle 10—in the direction of travel X—serve as receptacle devices secured in the backrest, each of which is configured to be tubular with a rectangular cross-section. According to the embodiment of FIG. 2, the receptacle devices secured in the backrest are configured as rectangular openings in a solid structural material, for example horizontal plates, comprising a left upper opening 13 and a left lower opening 14, which may be a rimmed opening, along with a right upper opening 15 and a right lower opening 16, in the backrest 8.

Figure 3:
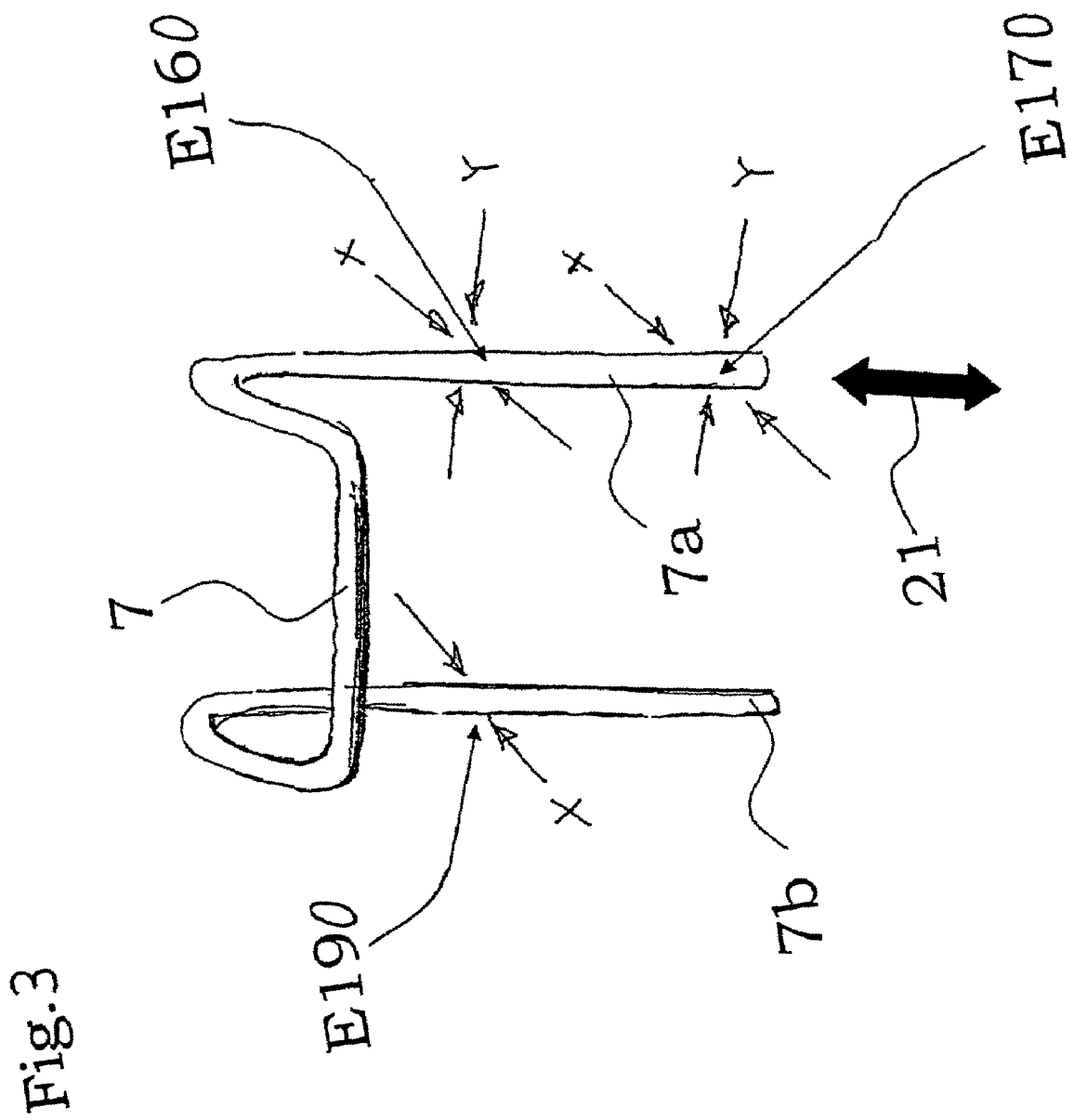
FIG. 3 shows the headrest frame with indication of its adjustment planes and degrees of freedom.

According to the invention the left headrest rod 7a, as the "fixed" headrest rod, is supported or fixed in the left guide sleeve 1 at at least two bearing points implemented as horizontal (XY) planes, namely an upper bearing point E160 and a lower bearing point E170, and the right headrest rod 7b is fixed or supported in the right guide sleeve 2 as a "movable" headrest rod at only one bearing point implemented as an XY plane, E190. The three-point bearing created in this manner reduces the degrees of spatial freedom of the headrest frame 7 with the headrest rods 7a, 7b to only one degree of freedom, which corresponds to the direction of mounting or adjustment 21 shown in FIG. 3.

Figure 6A:
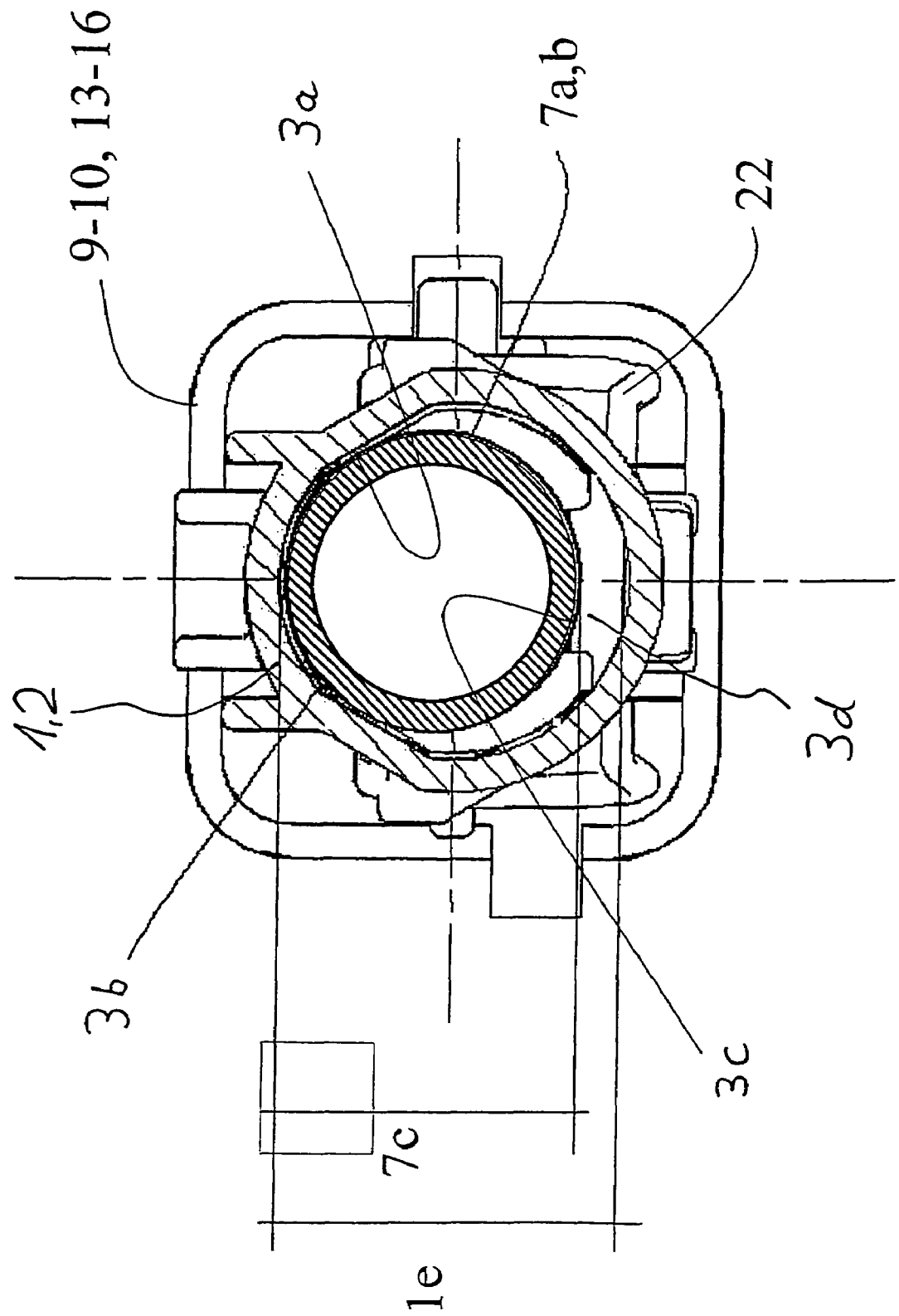
FIG. 6a shows an adjustment position for a headrest rod in its guide sleeve, in a radial cross-section.

FIG. 6a shows a cross-section in the XY plane of the bearing points E160, E170 or E190. Each headrest rod 7a or 7b is held in its respective bearing plane in a defined manner at three points. Flat inner surfaces 3a and 3b define a rigid prism. A further inner surface 3c presses the respective headrest rods 7a, 7b into this prism under spring tension. Thus in each bearing plane E160, E170 and E190 a secure, self-centering three-point mounting is achieved. The headrest rods 7a, 7b thus do not pull away from the bearing surfaces 3a, b, c up to a certain acceleration or inertial force, so that the production of noise is prevented.

The surface 3c is implemented, for example, as an interior surface of a flexible clip 3d, which is configured as a part of the respective guide sleeve 1, 2 and is prestressed toward the inside. Supplementarily, or as an alternative to this an auxiliary component, for example made from a material that will provide optimum sliding properties, may also be employed as the spring 3d. In order to ensure a defined adjustment, in each case one spring element 18 is advantageously supplementarily attached at each of the three bearing points E160, E170 and E190, as is shown, for example, in FIG. 6b.

Advantageously the vertical distance D between the bearing planes E160 and E170 is selected to be as great as possible. They thus lie advantageously near the ends of the receptacle 9 or in the region of the openings 13, 14. In this manner a maximum holding force for the headrest rods 7a, b is achieved, and minimal spring forces are required, respectively.

The spring elements 3d enable a precise application of the holding action against inertial forces that are present, for example, during driving on poor quality roads, and in the presence of other vibrations and acceleration forces. Furthermore, they influence the normal force exerted on the headrest rods 7a, 7b and thereby the frictional force exerted during adjustment of the headrest.

Because, according to the invention, the inner diameter 1e, indicated for example in FIG. 6a, of the fixed guide sleeve 1 is generously sized; i.e., with a sufficient difference with respect to the outer diameter 7c of the left headrest rod 7a, headrest rods 7a, 7b having a different or generously sized outer diameter 7c with tolerance, or having a corresponding roundness tolerance, can be inserted; nevertheless, no gaps are created between the headrest rods 7a, 7b and their respective guide sleeves 1,2. In principle, the generous dimensioning and configuration of the inner diameter 1e of the fixed guide sleeve 1 is already sufficient, so that therewith it can even compensate for tolerances of the right headrest rod 7b that is inserted into the movable guide sleeve 2. The flexible clip id or another corresponding flexible element presses with surface 1c against the outer wall of the headrest rod 7a, under the pressure of the spring 18. In this manner, the necessary precision of the radial rod dimensions is reduced to a minimum, which produces a positive effect in terms of cost. Tolerances with regard to the straightness of the headrest rods 7a, 7b are also compensated for according to the invention, since any bent curve or axis can be placed between two points.

In addition to the tolerances in the outer diameters and roundness of the headrest rods, tolerances occur in the Y direction in the track width B between the headrest rods 7a, b, and in the track width N between the axes A9 and A10 of the openings 13, 14 and 15, 16 secured in the backrest, or the receptacles 9, 10; i.e., tolerances of the backrest 8. If the first receptacle 9 or its axis A9 is used as a reference, these tolerances extend up to the second—i.e. right—receptacle 10 or its axis A10.

Figure 4A:
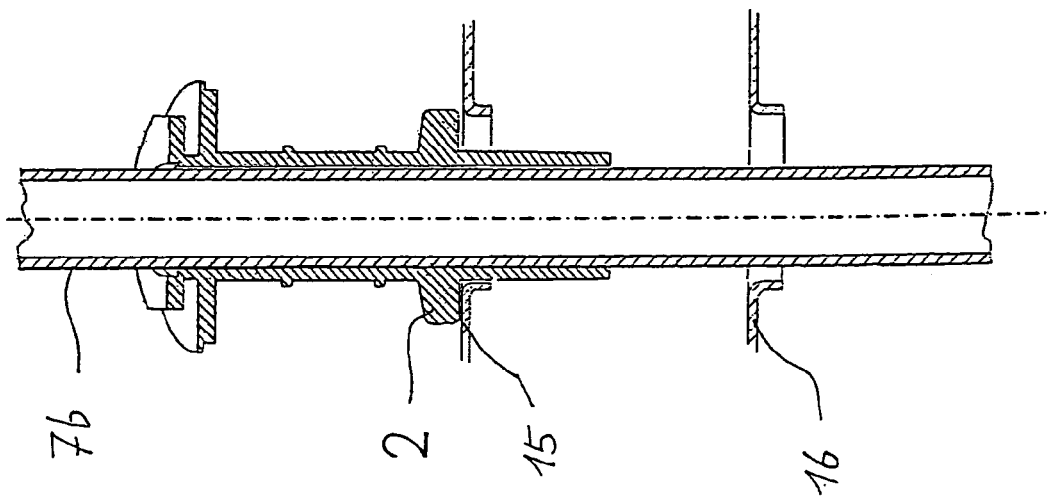
FIGS. 4a, b show an embodiment with a second guide sleeve that is freely adjustable within its openings, in two positions.
Figure 4B:
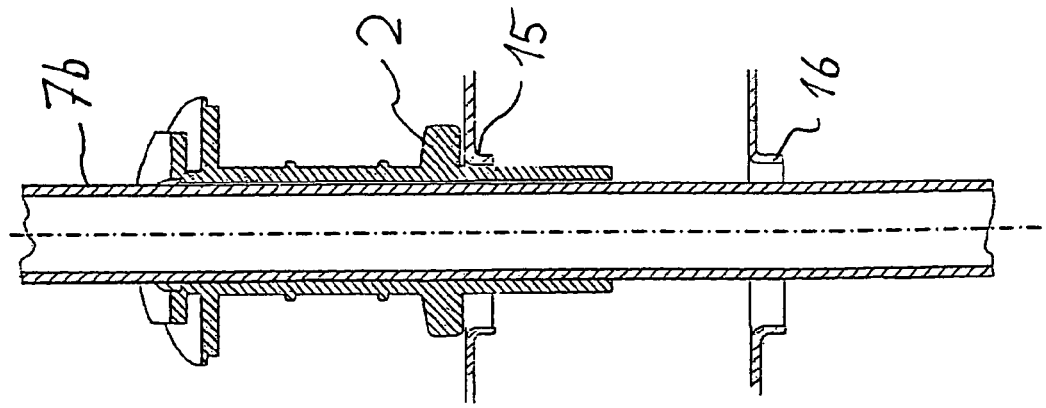
FIGS. 4c, d show an alternative embodiment to this, with a second guide sleeve that is held securely in its lower section, and is pivotable in the YZ plane, FIG. 4c with a frame that is too narrow or the distance between the openings is too great, and FIG. 4d with a frame that is too wide or the distance between the openings is too narrow.

These deviations in the track widths N and B are compensated for by the movable guide sleeve 2, in that this sleeve is substantially supported in the second receptacle 10 or in the second openings 15, 16 such that it can move in the Y direction or in the YZ plane, respectively. This movement in the Y direction can take place according to two alternative embodiments:

With the embodiment of FIGS. 4a, b, the right headrest rod 7b is held in the right—movable—guide sleeve 2 such that it can be shifted in the Z direction and is fixed in the XY plane; in this embodiment, the unit that is formed by the headrest rod 7b and the guide sleeve 2 freely rotatable and/or translatably adjustable in the right openings 15, 16.

Figure 4C:
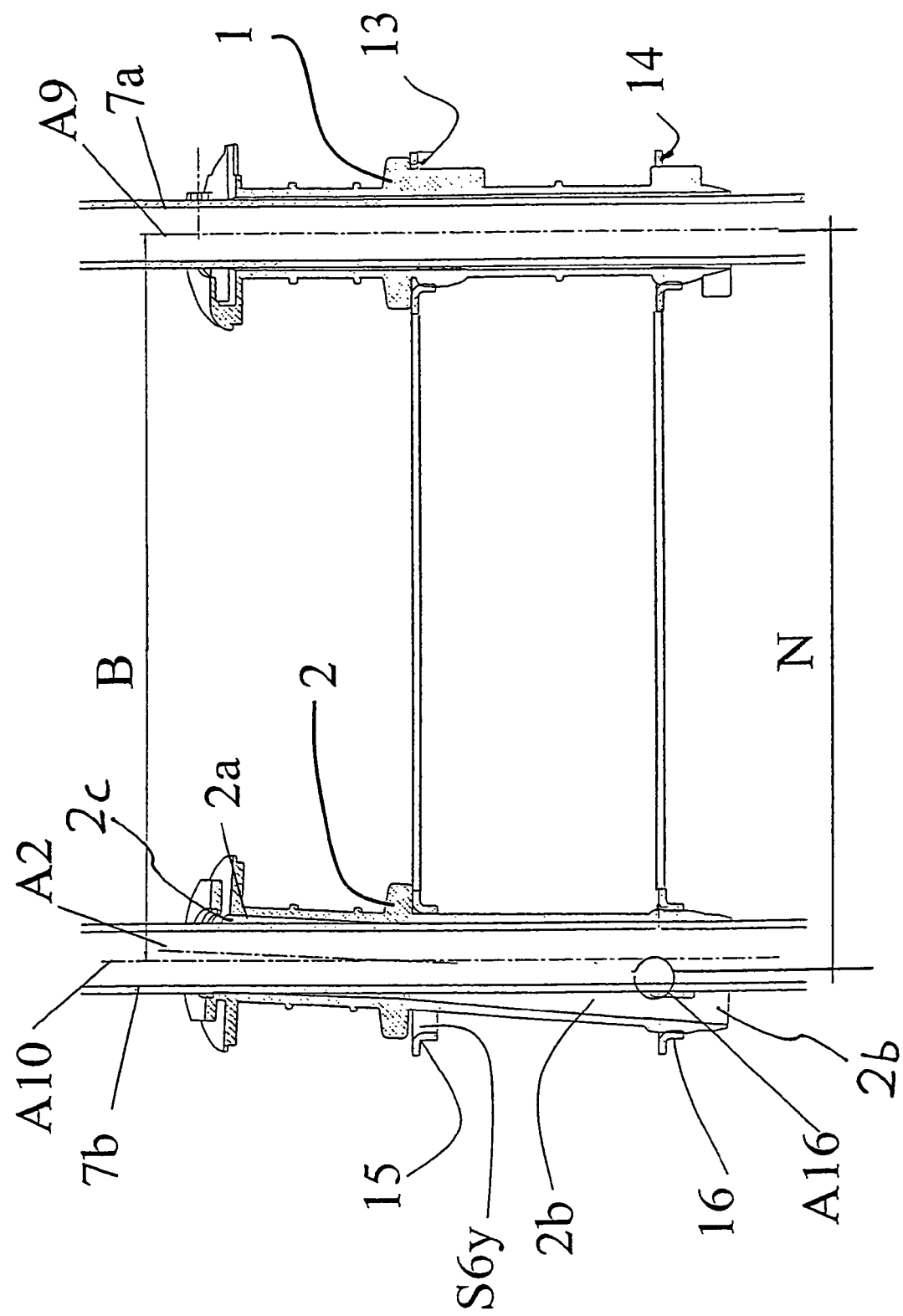

FIGS. 4c, d illustrates an alternative embodiment. In this case, the right "movable" headrest rod 7b extends through only one bearing point E190 in the movable guide sleeve 2 and can thus be inserted even if it deviates severely from being straight or is curved. For a noise-free and play-free support of the headrest frame 7 in the movable guide sleeve 2, the third bearing point E190 is configured to correspond to the bearing points E160, E170; i.e., according to those of FIGS. 6a, c. The movable guide sleeve 2 has at its lower end a funnel-shaped widened region 2b that is apparent in the axial cross-sections of FIGS. 4c, d and in the radial cross-section of FIG. 7 through the plane E200, and which starts at approximately the third bearing point E190 and leads to a widening of the circumference of the movable guide sleeve 2 toward the bottom. Correspondingly, on the upper side of the movable guide sleeve 2 a funnel-shaped section 2c that widens toward the top is formed. Thus between the headrest rod 7b and the inner surface 2a of the movable guide sleeve 2 gaps form, which give the headrest rod 7b corresponding freedom of movement, especially for pivoting movements around the bearing point E190.

With this embodiment of FIGS. 4c, d the right guide sleeve 2 is supported in the lower opening 16 or in the lower region of the receptacle 10, respectively, such that it can pivot around a longitudinal axis A16. Thus the second "movable" guide sleeve functions as a coupling or double joint between the rotational points A16 and E190, respectively, and enables a compensation for different track widths B in the Y direction between the headrest rods 7a, b and different track widths N between the openings 13, 14 and 15, 16 or the receptacles 9, 10 that are secured in the backrest, without these tolerances resulting in pivoting movements of the headrest rods 7a, b in the backrest 8. Advantageously, the openings 15, 16 or the right receptacle 10 are configured to have extra space in the Y direction, in order to allow the movement of the movable guide sleeve 2.

A headrest frame 7 that is too narrow; i.e., with a narrow track width B, will cause a movement of the right movable guide sleeve 2 toward the fixed left guide sleeve 1, as is shown in FIG. 4c. With this, the right movable guide sleeve 2 pivots on the bearing point A16. The same occurs when the track width N of the receptacles 9, 10 or 13, 16 is too great.

A headrest frame 7 that is too wide, with a track width B that is too large, will cause a movement of the movable right guide sleeve 2 away from the left fixed guide sleeve 1, as is shown in FIG. 4d, via a pivoting on the bearing point A16. The same applies if the track width N of the openings 13 through 16 or the receptacles 9, 10 is too narrow.

In this manner the tolerances on both the headrest side and the backrest side can be compensated for in the Y direction or in the YZ plane via rotational and/or linear adjustment in the seat-back receptacles 9, 10 or openings 13 through 16. Advantageously, the second headrest rod 7b has sufficient space in the Y direction to compensate both pure spacing tolerances and deviations in parallelism of the headrest rods 7a, 7b, without coming in contact with the inner wall 2a of the movable guide sleeve 2. Because this type of contact with the inner wall 2a is prevented via the construction of the device, the stimulation of vibrations and the development of noise can be prevented. Additionally, the inner walls 2a can be configured to be convex, so that a broadly pivoting headrest rod 7b is guided to a rolling movement along the inner wall 2, whereby the time of the impact is extended and noise damping is achieved.

The headrest frame 7 further includes tolerances in the parallelism of the headrest rod 7a, b and the receptacles 9, 10 or openings 13 through 16, respectively, secured in the backrest, in the X direction or the XZ plane. If the first receptacle axis A9 is used as a reference, these tolerances extend up to the second receptacle axis A10, as is shown in the cross-section through the XZ plane in FIG. 5. Staggering of the headrest rods 7a, b and the receptacle 9, 10 or openings 13 through 16 are compensated for in that the funnel-shaped widened regions 2b, 2c—as shown in FIGS. 4c, d—are also formed in the XZ plane at the upper and lower ends of the movable guide sleeve 2, and provide the necessary pivoting space for pivoting movements around the third bearing point E190. The headrest rod 7b thus has sufficient pivoting space in the XZ plane to compensate for deviations in parallelism relative to the fixed headrest rod 7a, without coming in contact with the inner wall 2a of the movable guide sleeve 2. The inner walls in turn are also advantageously configured to be convex in the XZ plane.

Both the exterior dimensions of the guide sleeves 1, 2 and the interior dimensions of the receptacles 9, 10 or the openings 13 through 16 are subject to tolerances. Advantageously, to prevent noise, a degree of play in the X and Y directions is ensured between the fixed guide sleeve 1 and its receptacle 9 in the backrest. To this end, the guide sleeves 1, 2 advantageously include flexible play compensation elements 22, 23 that are oversized by the amount S4x in the X direction, which compensate for the tolerances between the interior dimensions of the receptacles 9, 10 or the openings 13, 14, 15, 16 and the exterior dimensions of the guide sleeves 1, 2, as is shown, for example, in FIG. 6d. When installed, the play compensation elements 22, 23 are forced toward the inside depending upon the tolerance conditions. A radial gap S3x between the inner surface of the play compensation elements 22, 23 and the outer surface of the headrest rod 7a is kept sufficiently large to prevent friction resulting from contact between these components. Furthermore, the side of the guide sleeves 1, 2 that is radially opposite the play compensation elements 22, 23 rests securely against the inner wall of the receptacles 9, 10 in the X direction, via abutting contoured pieces; i.e., the abutting contoured pieces 29 are forced by the spring force of the flexible play compensation elements 22, 23 in the X direction against the inner wall of the receptacle 9, 10.

Figure 6D:
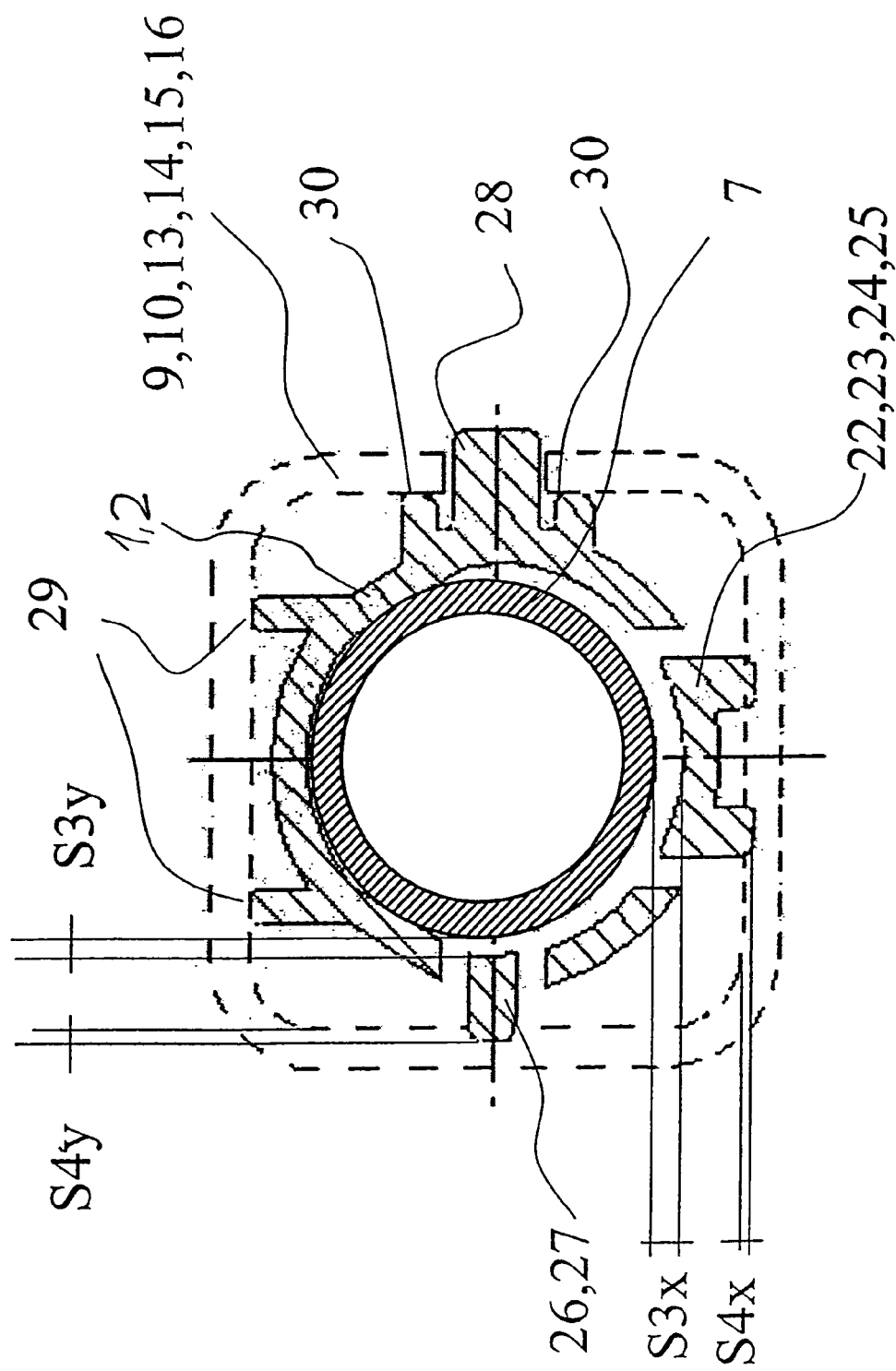
FIG. 6d is shows a radial cross-section; i.e., in the XY plane, of an adjustment position of the second guide component in the second receptacle or in the second opening.

In the Y direction, differences between the fixed and movable guide sleeves 1, 2 occur. The fixed guide sleeve 1 include play compensation elements 26, 27 that are oversized by the amount S4y in the Y direction, as is also shown in FIG. 6d.

The play compensation elements 26, 27 are correspondingly forced inward to compensate for tolerances in the Y direction upon insertion into the left receptacle 9, and in this produce a spring force of radially opposite abutting contoured pieces 30 against the inner wall of the left receptacle 9. Also in the Y direction, a radial gap S3y between the inner wall of the play compensation elements 26, 27 and the fixed headrest frame 7a is kept large enough that no contact occurs between these components.

However, the movable guide component 2 must remain movable in the Y direction. To accomplish this, the movable guide sleeve 2 has a sufficient gap S5y to one side and S6y to the other side in the region of the upper opening 15 (or the upper region of the receptacle 10), as is shown in FIG. 7a. Thus during normal operation, contact between the abutting contoured pieces 30 on its two outer surfaces and the inner wall of the opening 15 is prevented, and occurs only in borderline cases. In contrast, the movable guide sleeve 2 utilizes the entire width in the Y direction, in the region of the lower opening 16 (or the lower section of the receptacle 10), to give the movable headrest rod 7b the necessary space to compensate parallelism, as is shown in FIG. 7b. The abutting elements 31 of the movable guide sleeve 2 lie, under spring tension, against the inner surfaces of the receptacle 10 or of the opening 16, in order to secure it, without play, in the Y direction. With this, the abutting elements 31 are oversized by the amount S4y, and are in turn pressed correspondingly radially inward when inserted. A gap S7y is sufficiently large to prevent any contact with the movable headrest rod 7b.

The flexible play compensation elements 22, 23, 24, 25, 26, 27 are advantageously formed as part of the respective guide sleeves 1, 2. Supplementarily, additional external spring elements 18 may be attached for support, which are configured to correspond to the inertial forces acting on the headrest. The flexible play compensation elements 22 through 27 thus always lie at the openings 13 through 16, in order to ensure a defined positioning in the backrest.

Figure 8:
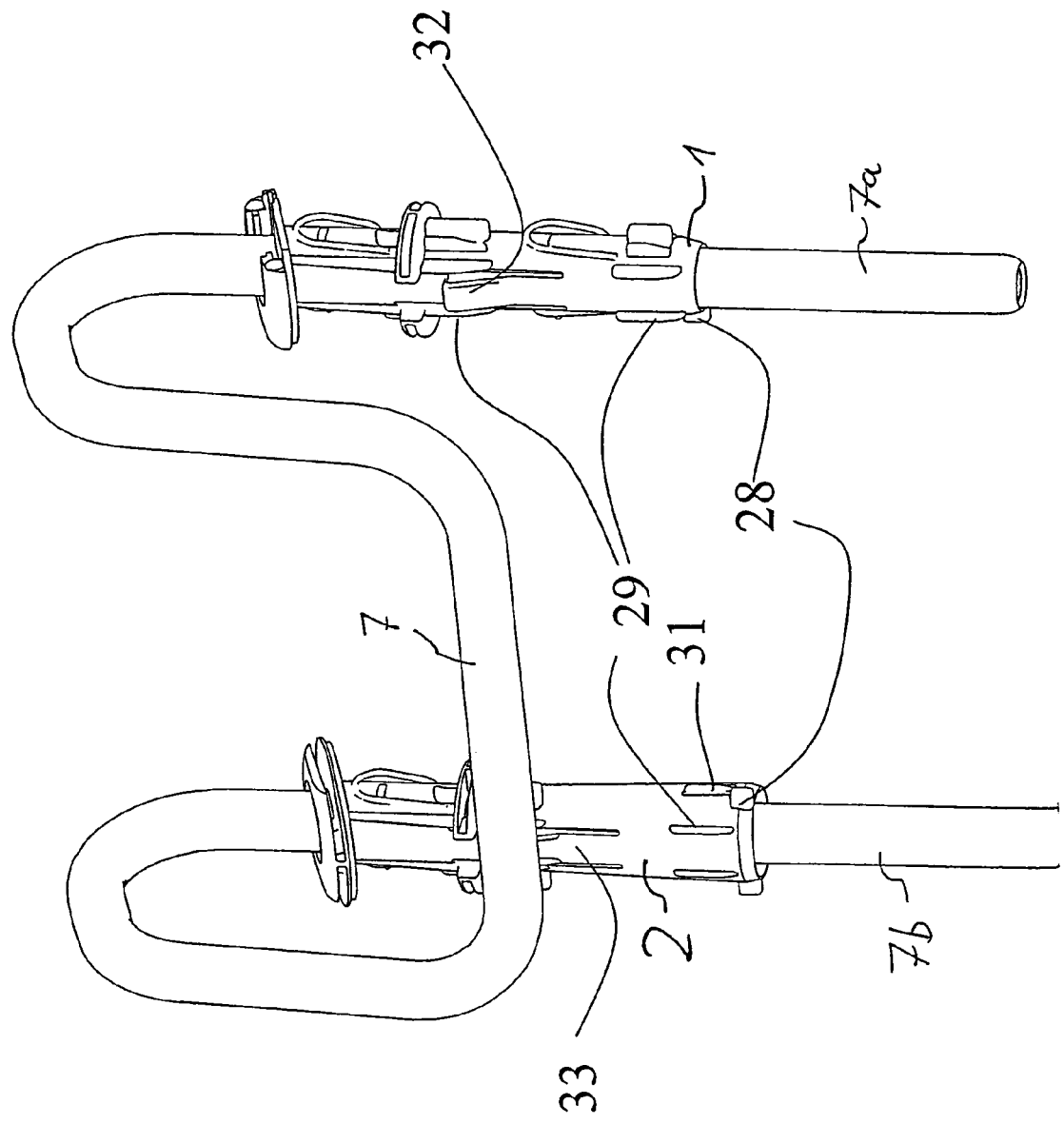
FIG. 8 shows the headrest frame with guide sleeves according to FIG. 6b, in a perspective view from the front.

Advantageously, the guide sleeves 1, 2 shown in FIG. 8 are provided with snap-fits 32, 33, which prevent the guide sleeves 1, 2 from being pulled out of the receptacles 9, 10 or the openings 13 through 16 in the backrest during adjustment or in the event of a crash. The precise positioning of the quick-release hooks 32, 33 can be configured to conform to the adjustment options. In the case of the openings 13 through 16, the respective snap-fits 32, 33 advantageously lie directly at one of the openings 13 through 16 and lock in the Z direction. When receptacles 9, 10 are used, these can comprise windows 34, 35, which are partially visible in the perspective illustration of FIG. 1, and serve to stop-catch the quick-release hooks 32, 33.

Furthermore, a transposition of the movable and fixed sides can be prevented by use of a corresponding coding of the receptacles 9, 10 or the openings 13 through 16 and/or the guide sleeves 1, 2. According to FIG. 2, at least one opening 13 can be provided with a corresponding coding groove 36 and the corresponding guide sleeve 1 or 2 can be provided with a corresponding catch 28, for example at its lower end, as is shown in FIG. 8.

In the embodiment of the openings 15, 16 or the receptacle 10 having a rectangular cross-section as shown here, the movable guide sleeve 2 can be configured as a unitary piece. The springs 18 configured to support the compensation of play can be identical in configuration for the two guide sleeves 1, 2.

Figure 9:
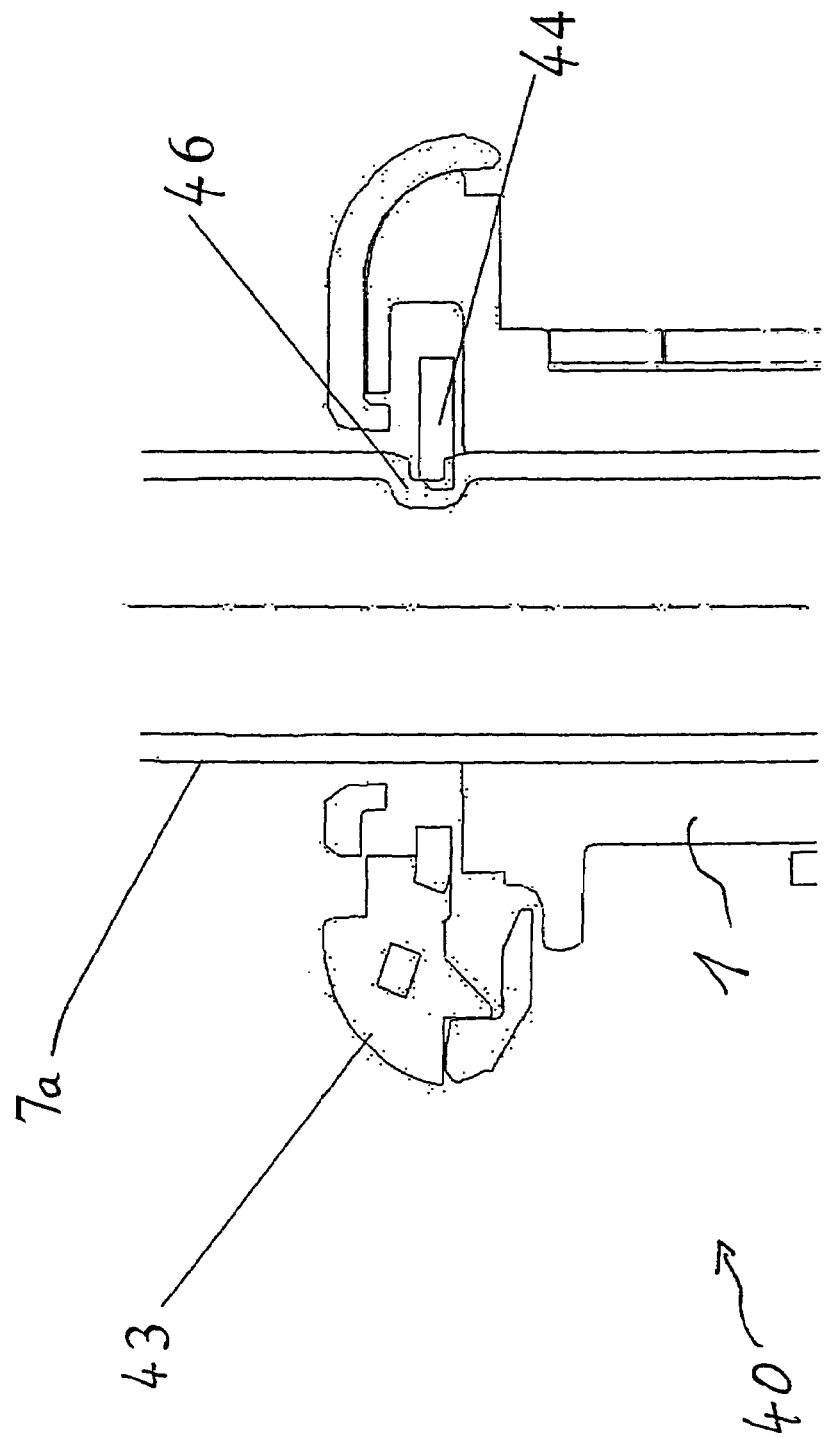
FIG. 9 shows an axial cross-section through one leg of the frame, in the region of its vertical latching.

FIG. 9 shows an example of a height-adjustment and securing device 40 for the headrest, comprising a button 43 to be pressed by the user, with a latch 44 that catches in at least one notch 46 in a headrest rod 7a, b. Advantageously the button 43 acts on the fixed side; i.e., the notch 46 is configured to be in the headrest rod 7a and is engaged by the latch 44, because then the actuation forces will not cause a shifting of the entire guide sleeve 1 in the Y direction, which could produce additional friction on the headrest frame 7.

While this invention has been described as having a preferred configuration, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

The invention claimed is:

1. Mounting device for a vehicle headrest of the type having two headrest rods for use with a vehicle seat, comprising:
   a) a first guide sleeve configured for height-adjustably receiving a first headrest rod;
   b) a second guide sleeve configured for height-adjustably receiving a second headrest rod;
   c) a first receptacle device configured for being secured in a backrest, in use;
   d) the first guide sleeve being held in and resting against the first receptacle device at least two axially spaced bearing points;
   e) a second receptacle device configured for being secured in a backrest, in use;
   f) the second guide sleeve being shiftable at least in a transverse Y direction within the second receptacle device;
   g) the second guide sleeve resting within the second receptacle device received in the backrest, in use;
   h) the second guide sleeve is pivotably held in the second receptacle device, which is securable in the backrest; and
   i) the second headrest rod is pivotably held in the second guide sleeve.

2. Mounting device according to claim 1, wherein:
   a) the second headrest rod is shiftable within the second guide sleeve at least in the transverse Y direction.

3. Mounting device according to claim 2, wherein:
   a) an inner surface of the second guide sleeve has, in an XZ plane, a lower funnel-shaped region that widens toward the bottom, and an upper funnelshaped region that widens toward its top, as pivoting space for the second headrest rod.

4. Mounting device according to claim 2, wherein:
   a) the second headrest rod is shiftable in the second guide sleeve in a horizontal XY plane perpendicular to a vertical Z direction of height adjustment; and
   b) the second guide sleeve is shiftable in the second receptacle device, which is securable in the backrest, in the XY horizontal plane perpendicular to the Z direction of height adjustment.

5. Mounting device according to claim 1, wherein:
   a) different pivoting positions of the second guide sleeve are set, in use, when one of different track widths in the transverse Y direction of the first and second headrest rods and different track widths in the transverse direction Y of the first and second receptacle devices which are securable in the backrest; and
   b) a pivot point of pivoting positions for the second guide sleeve in the second receptacle device, and a pivot point for the second headrest rod in the second guide sleeve are spaced from one another in an axial direction.

6. Mounting device according to claim 1, wherein:
a) an inner surface of the second guide sleeve has, in an YZ plane, a lower funnel-shaped region that widens toward its bottom, and an upper funnelshaped region that widens toward the top, as pivoting space for the second headrest rod.

7. Mounting device according to claim 1, wherein:
a) the second headrest rod is held, fixed in an X direction, and fixed in a Y direction perpendicular to the X direction, in the second guide sleeve; and
b) the second guide sleeve is held in the second receptacle device, secured in the backrest, such that it can be linearly and rotationally adjusted.

8. Mounting device according to claim 1, wherein:
a) flexible clips are provided in the first and second guide sleeves, which press the headrest rods against the inner surfaces of the first and second guide sleeves.

9. Mounting device according to claim 1, wherein:
a) spring elements are attached to the first and second guide sleeves for the purpose of exerting a clamping force on the headrest rods.

10. Mounting device according to claim 1, wherein:
a) the first headrest rod is inserted into the first guide sleeve without play in an X direction perpendicular to the Y direction.

11. Mounting device according to claim 1, wherein:
a) the first guide sleeve is inserted in the first receptacle device that is secured in the backrest, without play in the Y direction, in an X direction perpendicular to the Y direction, and in a Z direction perpendicular to the X direction and to the Y direction.

12. Mounting device for a vehicle headrest of the type having two headrest rods for use with a vehicle seat, comprising:
 a) a first guide sleeve configured for height-adjustably receiving a first headrest rod;
 b) a second guide sleeve configured for height-adjustably receiving a second headrest rod;
 c) a first receptacle device configured for being secured in a backrest, in use;
 d) the first guide sleeve being held in and resting against the first receptacle device at least two axially spaced bearing points;
 e) a second receptacle device configured for being secured in a backrest, in use;
 f) the second guide sleeve being shiftable at least in a transverse Y direction within the second receptacle device;
 g) the second guide sleeve resting within the second receptacle device received in the backrest, in use;
 h) the second headrest rod is shiftable within the second guide sleeve at least in the transverse Y direction; and
 i) an inner surface of the second guide sleeve has, in an XZ plane, a lower funnelshaped region that widens toward the bottom, and an upper funnelshaped region that widens toward its top, as pivoting space for the second headrest rod.

13. Mounting device for a vehicle headrest of the type having two headrest rods for use with a vehicle seat, comprising:
 a) a first guide sleeve configured for height-adjustably receiving a first headrest rod;
 b) a second guide sleeve configured for height-adjustably receiving a second headrest rod;
 c) a first receptacle device configured for being secured in a backrest, in use;
 d) the first guide sleeve being held in and resting against the first receptacle device at least two axially spaced bearing points;
 e) a second receptacle device configured for being secured in a backrest, in use;
 f) the second guide sleeve being shiftable at least in a transverse Y direction within the second receptacle device;
 g) the second guide sleeve resting within the second receptacle device received in the backrest, in use;
 h) the second headrest rod is shiftable within the second guide sleeve at least in the transverse Y direction;
 i) the second headrest rod is shiftable in the second guide sleeve in a horizontal XY plane perpendicular to a vertical Z direction of height adjustment; and
 j) the second guide sleeve is shiftable in the second receptacle device, which is securable in the backrest, in the XY horizontal plane perpendicular to the Z direction of height adjustment.

* * * * *